(12) United States Patent  
Gershfeld

(10) Patent No.: US 9,197,838 B2  
(45) Date of Patent: Nov. 24, 2015

(54) SYSTEM FOR SUPPLYING AC POWER TO A DISPLAY VIA A LOW VOLTAGE CABLE

(71) Applicant: Jack Gershfeld, Fullerton, CA (US)

(72) Inventor: Jack Gershfeld, Fullerton, CA (US)

( * ) Notice: Subject to any disclaimer, the term of this patent is extended or adjusted under 35 U.S.C. 154(b) by 535 days.

(21) Appl. No.: 13/707,657

(22) Filed: Dec. 7, 2012

(65) Prior Publication Data

US 2014/0159510 A1    Jun. 12, 2014

(51) Int. Cl.
*H02M 7/42* (2006.01)
*H04N 5/63* (2006.01)
*H04N 21/443* (2011.01)

(52) U.S. Cl.
CPC .............. *H04N 5/63* (2013.01); *H04N 21/4436* (2013.01)

(58) Field of Classification Search
CPC ........ H02M 7/42; H04N 5/63; H04N 21/4436
USPC .......................................................... 307/151
See application file for complete search history.

(56) References Cited

U.S. PATENT DOCUMENTS

| | | | |
|---|---|---|---|
| 5,227,776 A * | 7/1993 | Starefoss | 340/6.1 |
| 2003/0142060 A1* | 7/2003 | Lee et al. | 345/102 |
| 2011/0057724 A1* | 3/2011 | Pabon | 327/581 |

\* cited by examiner

*Primary Examiner* — Thienvu Tran  
*Assistant Examiner* — Kevin J Comber  
(74) *Attorney, Agent, or Firm* — Vladi Khiterer

(57) ABSTRACT

A system for supplying AC power to a display via a CAT7 or similar low voltage cable comprises a transmitter connected to an AC power outlet and generating DC voltage transmitted by the CAT7 cable to a receiver. The receiver converts the DC voltage to AC voltage and supplies AC power to the display. A limiting circuit limits power transmitted by the CAT7 cable to a predetermined wattage, depending on the feedback from the receiver, which insures safe operation of the system. Power from the display is disconnected if a pre-programmed power consumed by the display is exceeded or falls below a predetermined threshold.

13 Claims, 6 Drawing Sheets

SYSTEM FOR SUPPLYING AC POWER TO A DISPLAY VIA A LOW VOLTAGE CABLE

FIELD OF THE INVENTION

The present invention relates to a system for supplying AC power to a display via a low voltage cable, such that a dedicated AC power outlet is no longer necessary.

BACKGROUND OF THE INVENTION

It is frequently desirable to install displays, such as flat screen TVs and the like, on concrete or masonry walls or in other locations lacking existing AC power outlets. Installing AC power outlets and running high voltage power cables to supply AC power to displays in such locations is often expensive and unsightly. In some cases, due to a historical nature of buildings, it is not possible to install electrical outlets and avoid damaging surrounding walls. In addition, installing AC power outlets requires a licensed high voltage contractor to do the installation. The same is true when a display is placed or installed temporarily with no power outlets within convenient reach. At the same time, low voltage cables, such as CAT5, CAT6 and CAT7 type cables, are frequently used to supply audio visual content, network and control signals to displays. These CAT type cables are small in diameter and are easy to route and feed through a wall, ceiling and floors. The CAT type cables can be installed by a low voltage contractor who is already on installation site and is involved in installation of audio visual equipment.

Therefore, there is a need for a system for supplying AC power to a display via a low voltage cable, such that a dedicated AC power outlet connected by high voltage power cable is no longer necessary.

SUMMARY OF THE INVENTION

The system for supplying AC power to a display via a low voltage cable according to this invention satisfies this need. It comprises a transmitter connected to an AC power outlet and generating DC voltage transmitted by a low voltage cable, comprising at least two wires, to a receiver. The receiver then converts the DC voltage, to AC voltage and supplies AC power to the display. A limiting circuit in the transmitter limits power transmitted by the low voltage cable to a predetermined wattage, depending on the feedback from the receiver, which insures safe operation of the system.

DETAILED DESCRIPTION

Figure 1:
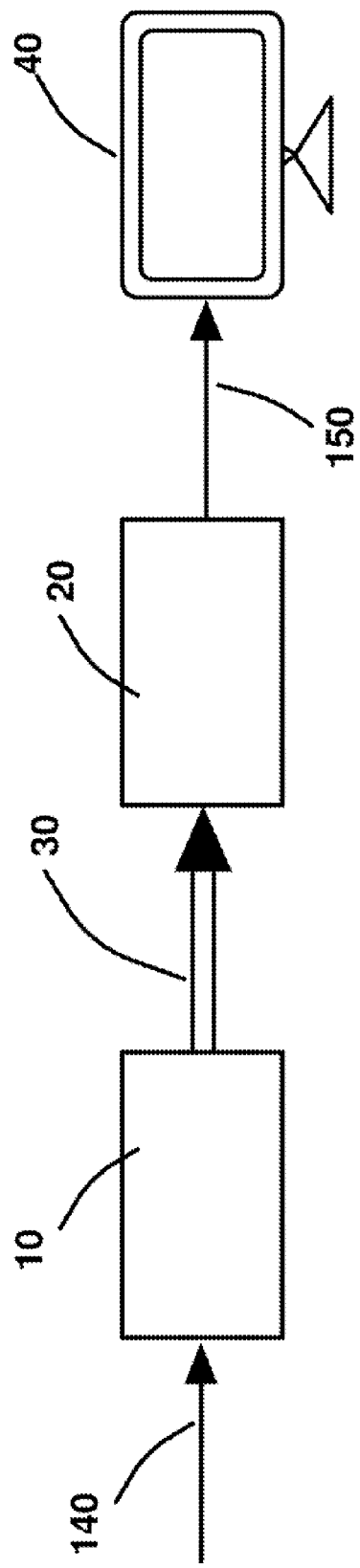
FIG. 1 shows a schematic of a system according to this invention.

This invention will be better understood with reference to the drawing FIGS. 1 through 6. The same numerals refer to the same elements on all drawing figures.

Viewing FIG. 1, numeral 10 indicates a transmitter. Numeral 20 indicates a receiver. Numeral 30 indicates a low voltage cable. Numeral 40 indicates a display. Numeral 140 indicates a first voltage. Numeral 150 indicates a third voltage. Transmitter 10 is energized by first voltage 140. Transmitter 10 generates a second voltage energizing receiver 20 by way of low voltage cable 30 connecting transmitter 10 and receiver 20. Receiver 20 generates third voltage 150 and supplies same to display 40. First voltage 140 is AC, the second voltage is DC and third voltage 150 is AC.

Figure 2:
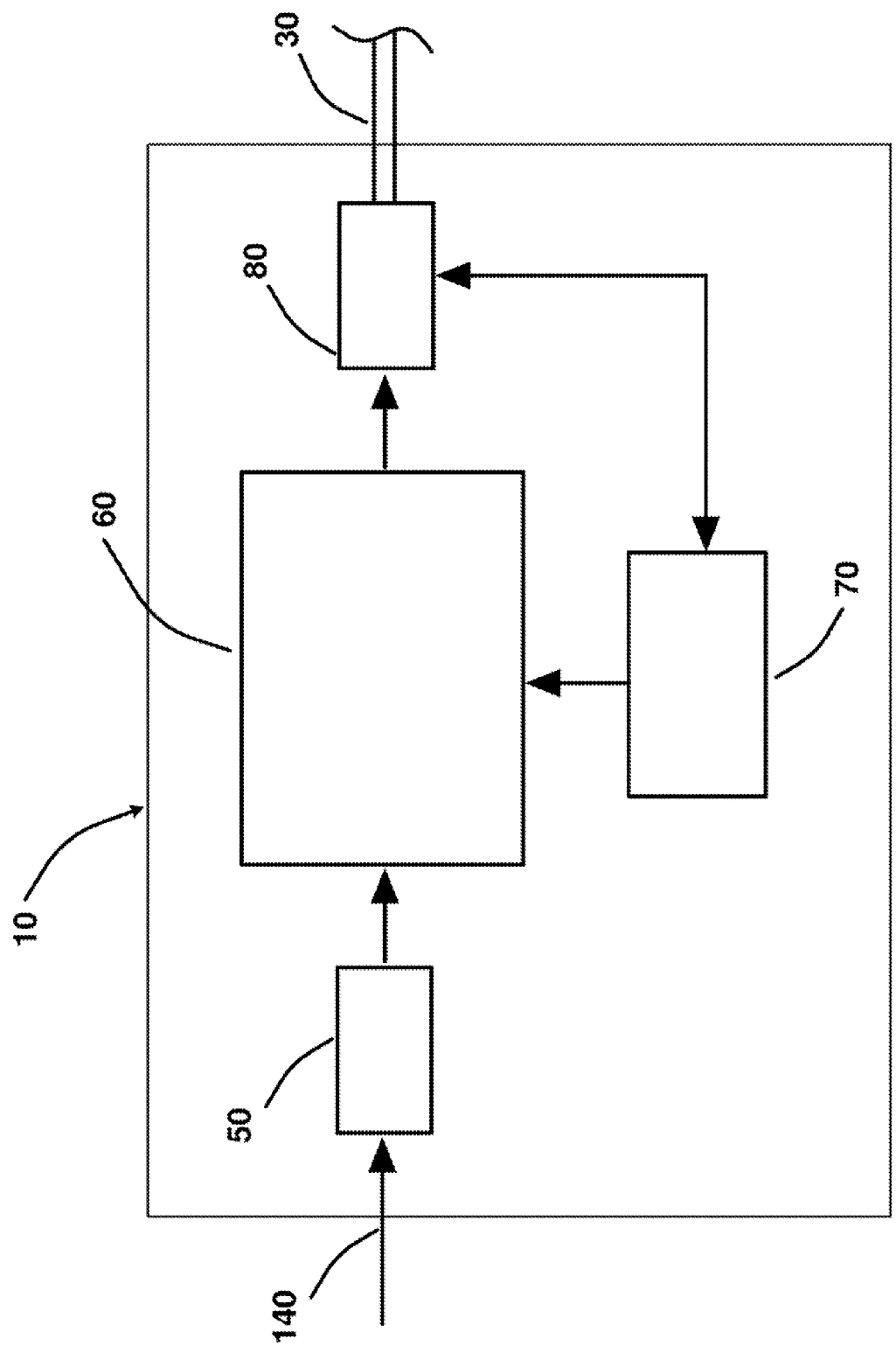
FIG. 2 shows a schematic of a transmitter according to this invention.

Viewing now FIG. 2, numeral 50 indicates a first converter circuit. First converter circuit 50 converts first voltage 140 into a DC second voltage. Numeral 60 indicates a limiting circuit. Limiting circuit 60 has engaged and disengaged positions, such that the disengaged position limits power transmitted via low voltage cable 30 to a first wattage and the engaged position allowing up to a second wattage to be transmitted via low voltage cable 30.

Numeral 70 indicates an interrogating circuit interrogating circuit 70 controls limiting circuit 60 by way of interrogating receiver 20 with an interrogating signal at a predetermined frequency. Interrogating circuit 70 places limiting circuit 60 in the engaged position if receiver 20 is in communication with transmitter 10. Interrogating circuit 70 places limiting circuit 60 in the disengaged position if receiver 20 is not in communication with transmitter 10. Interrogating circuit 70 generates the interrogating signal. The interrogating signal is in a digital format and is transmitted as a data packet to receiver 20. The data packet contains information that allows receiver 20 to know that a specific transmitter type is sending this data. Upon receipt of this signal, receiver 20 will acknowledge it and will send back confirmation identifying itself as capable of receiving the second wattage. Once interrogating circuit 70 receives the acknowledgment signal from receiver 20, it will place limiting circuit 60 into the engaged position to increase power output.

The interrogation occurs at least one time per second. This is done to assure that if low voltage cable 30 is disconnected from receiver 20 or accidently cut, the power available from transmitter 10 is reduced to the first wattage. If the interrogating signal is not received by receiver 20 within one second, receiver 20 automatically shuts down third voltage 150 to maintain safety interlock.

Figure 3:
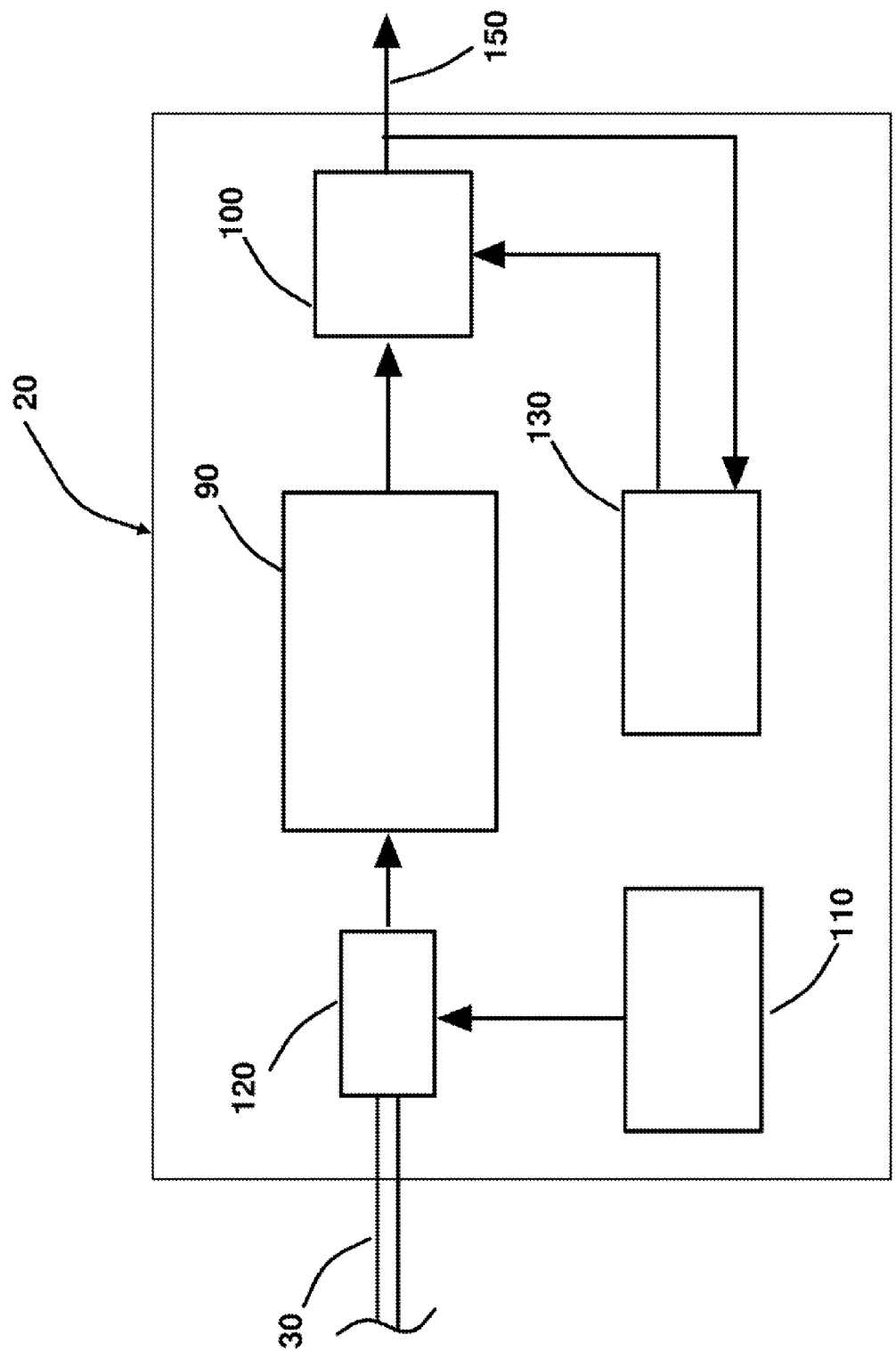
FIG. 3 shows a schematic of a receiver according to this invention.

Viewing now FIG. 3, numeral 90 indicates a second converter circuit. Second converter circuit 90 converts the second voltage to the fourth voltage. Numeral 100 indicates an inverter circuit. Inverter circuit 100 converts the fourth voltage to the third voltage. The fourth voltage is DC and is substantially double the second voltage.

In the preferred embodiment described with the reference to the drawing FIGS. 1 through 6, the first voltage is substantially between 100V and 240V; the second voltage is substantially 60V; the third voltage is substantially between 95V and 120V.

Figure 4:
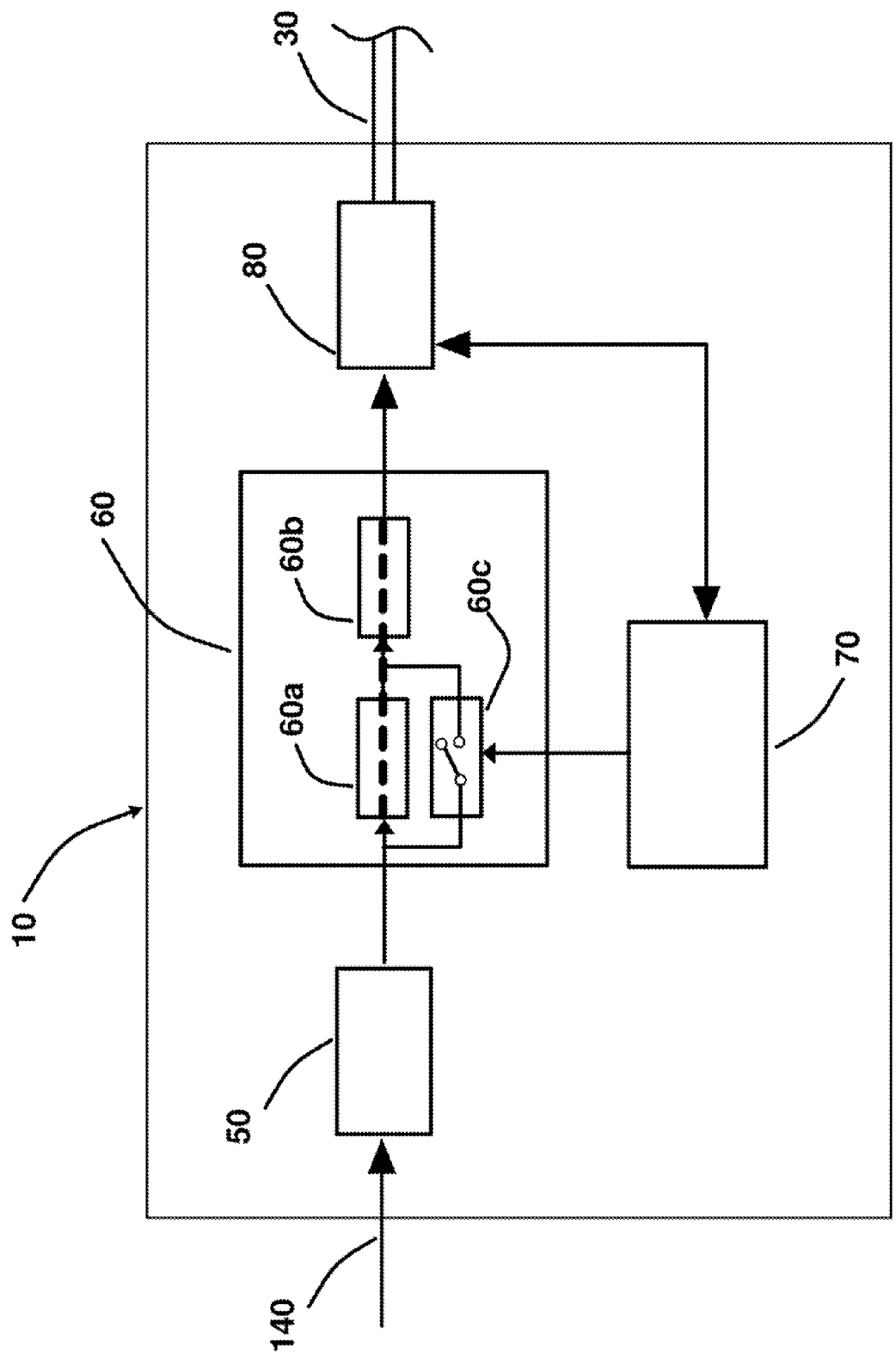
FIG. 4 shows a schematic of a transmitter with the limiting circuit in a disengaged position.

Viewing now FIG. 4, limiting circuit 60 is shown in the disengaged position, thus only the first wattage is available to low voltage cable 30. In the preferred embodiment described with the reference to the drawing FIGS. 1 through 6, the first wattage is substantially 100 W. Further, in the preferred embodiment, limiting circuit 60 further comprises a first fuse indicated by numeral 60a, a second fuse indicated by numeral 60b and a relay indicated by numeral 60c. The fuse type is a polyfuse that disconnects current flow when current limit of the fuse is exceeded and reconnects current back when current flow is below the current rating of the fuse.

First fuse 60a is connected serially to first converter circuit 50. Second fuse 60b is connected serially to first fuse 60a.

Relay 60c is connected in parallel with first fuse 60a between first converter circuit 50 and second fuse 60b. FIG. 4 shows relay 60c being open. Relay 60c is open in the disengaged position and closed in the engaged position. First fuse 60a has lower current limit rating than second fuse 60b. When relay 60c is open, current passes through both first fuse 60a and second fuse 60b, as indicated by a heavy dashed line in FIG. 4. Accordingly, power transmitted via low voltage cable 30 is limited to the first wattage, which is in this case 100 W.

Figure 5:
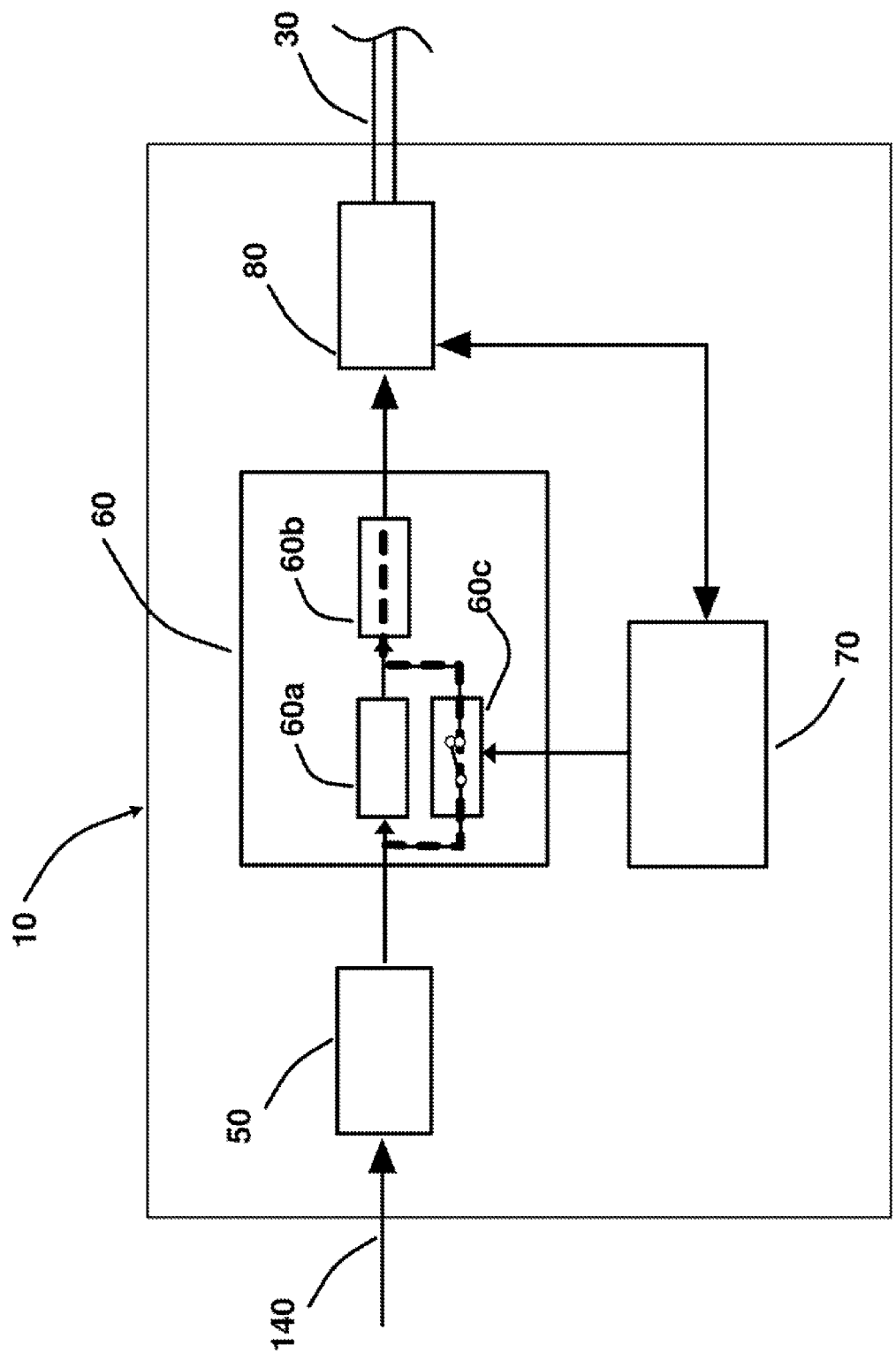
FIG. 5 shows a schematic of a transmitter with the limiting circuit in an engaged position.

Viewing now FIG. 5, limiting circuit 60 is shown in the engaged position, thus allowing up to the second wattage to be transmitted via low voltage cable 30. In the preferred embodiment described with the reference to the drawing FIGS. 1 through 6, the second wattage is substantially 172 W.

National Electrical Code (NEC) dictates that the maximum power transmitted over a CAT type cable is 100 W. In the same Code, there is an exemption that if the receiver is known then the power can be increased to about 200 W. When using CAT type cables, special connectors are used to connect cables and equipment. The connectors are referred to as RJ-45. The RJ-45 connectors are rated to maximum 172 W and this is the limitation of the second wattage.

When relay 60c is closed, current bypasses first fuse 60a and passes only through second fuse 60b, as indicated by a heavy dashed line in FIG. 5. Accordingly, power transmitted via low voltage cable 30 is allowed up to the second wattage, which in this case is 172 W.

In the preferred embodiment, interrogating receiver 20 by interrogating circuit 70 further comprises receiving, by interrogating circuit 70, a positive or negative authentication signal. The positive authentication signal is received when receiver 20 is capable of accepting the second wattage (i.e., 172 W). The negative authentication signal is received when receiver 20 is not capable of accepting the second wattage and can only accept first wattage. Interrogating circuit 70 places limiting circuit 60 in the engaged position in the event the positive authentication signal is received and places limiting circuit 60 in the disengaged position in the event the negative authentication signal is received.

Interrogating circuit 70 generates interrogating signal. This signal is in digital format and is transmitted as a data packet to receiver 20. The data packet contains information that allows receiver 20 to know that a specific transmitter type is sending this data. This information may contain model number, manufacturer name and serial number of transmitter 10. Upon receipt of this signal, receiver 20 will acknowledge it and will send back confirmation identifying itself as capable of receiving the second wattage. Once interrogating circuit 70 receives the acknowledgment signal from receiver 20, it will place limiting circuit 60 in the engaged position to increase power output.

Viewing now, simultaneously, FIGS. 2, 4 and 5, numeral 80 indicates a first combiner circuit. First combiner circuit 80 is connected serially to second fuse 60b and is in communication with interrogating circuit 70. First combiner circuit 80 combines the second voltage and the interrogating signal and separates the second voltage from the positive or negative authentication signal.

Combiner circuit 80 comprises a transformer that separately passes DC voltage for power and a high frequency digital signal for interrogation. These two signals simultaneously pass through the transformer and are available at receiver 20. The interrogation signal can pass bidirectionaly between transmitter 10 and receiver 20.

Viewing again FIG. 3, numeral 110 indicates a responding circuit. Responding circuit 110 communicates either the positive or negative authentication signal to interrogating circuit 70 in response to the interrogating signal. Numeral 120 indicates a second combiner circuit. Second combiner circuit 120 is connected serially to second converter circuit 90 and is in communication with responding circuit 110. Second combiner circuit 120 combines the second voltage with the positive or negative authentication signal and separates the second voltage from the interrogating signal.

Combiner circuit 120 comprises a transformer that separately passes DC voltage for power and a high frequency digital signal for interrogation to responding circuit 110. These two signals simultaneously pass through the transformer and are available at receiver 20. The interrogation signal can pass bidirectional between transmitter 10 and receiver 20.

Numeral 130 indicates a current managing circuit. Current managing circuit 130 increases voltage to display 40 at a predetermined rate. In the preferred embodiment, the predetermined rate is substantially between 10 and 50 volts per second.

All displays have capacitors on the power input. These capacitors are used to maintain steady voltage after AC power is received and rectified. Mere presence of these capacitors creates an in-rush current that can exceed 100 amps when AC power is applied to the monitor. This inrush current, if not managed, would exceed the current limit established for RJ-45 connectors and the current limit of the second voltage 50. To reduce the inrush current, third voltage 150 on the input to display 40 needs to be slowly increased. This slow voltage rise allows display 40 input capacitors to charge at a slower rate and reduce inrush current to acceptable level. Depending on the display type and input capacitance, the rate of voltage increase can vary between 10 to 50 volts per second and still maintain acceptable inrush current.

Further, current managing circuit 130 disconnects power from display 40 if a pre-programmed power consumed by display 40 is exceeded. In the preferred embodiment, the preprogrammed power is substantially 150 W.

The total power transmitted over low voltage cable 30 is 172 W. The cable resistance loss, circuitry and efficiency of the voltage conversion in receiver 20 will use about 22 W, therefore the maximum power available for display 40 is substantially 150 W. If receiver 20 circuitry power consumption is decreased and conversion efficiency from the second voltage to the fourth voltage and to third voltage 150 is increased, then the output power can be increased above 150 W.

Further, current managing circuit 130 disconnects power from display 40 if third voltage 150 falls below a predetermined threshold. In the preferred embodiment, the predetermined threshold is substantially 50 volts.

As low voltage cable 30 length is increased, the power available to receiver 20 is decreased, since there is the power loss in low voltage cable 30. Once voltage drops to about 50 volts, converter 90 is not capable of producing the voltage necessary fir display 40 to operate properly. Convertor 90 produces the third voltage that needs to be substantially 95 to 120 volts. If third voltage 150 is below 95 volts, it will not produce enough voltage for display 40 to operate.

Figure 6:
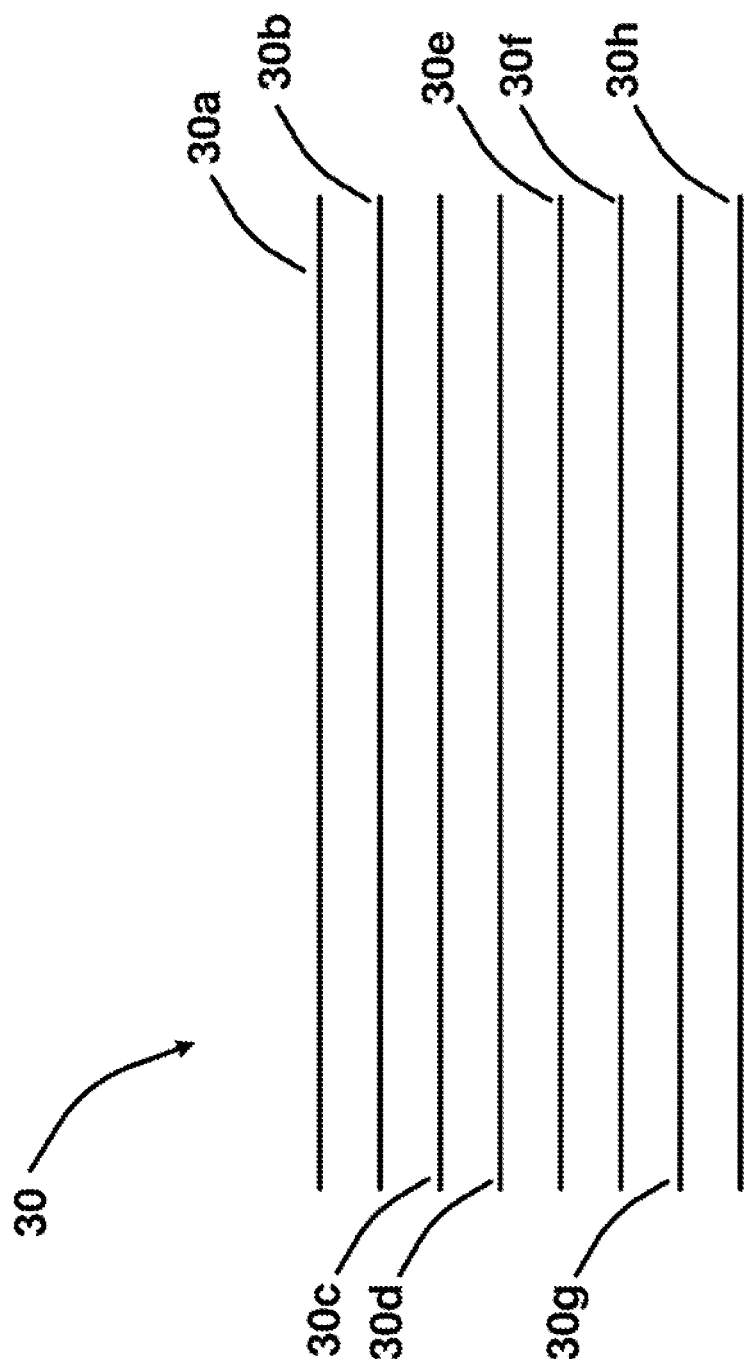
FIG. 6 shows a schematic of a CAT5, CAT6 or CAT7 cable connecting the transmitter and receiver according to the preferred embodiment of this invention.

Viewing now FIG. 6, low voltage cable 30 is selected from the group consisting of a CAT5 cable, CAT6 cable and CAT7 cable. In the preferred embodiment shown in FIG. 6, a CAT7 cable comprising eight wires indicated by numerals 30a, 30b, 30c, 30d, 30e, 30f, 30g and 30h is used.

Wires 30a, 30b, 30c and 30d transmit the positive side of the second voltage and wires 30e, 30f, 30g and 30h transmit the negative side of the second voltage.

While the present invention has been described and defined by reference to the preferred embodiment of the invention, such reference does not imply a limitation on the invention, and no such limitation is to be inferred. The invention is capable of considerable modification, alteration, and equivalents in form and function, as will occur to those ordinarily skilled and knowledgeable in the pertinent arts. The depicted and described preferred embodiment of the invention is exemplary only, and is not exhaustive of the scope of the invention. Consequently, the invention is intended to be limited only by the spirit and scope of the appended claims, giving full cognizance to equivalents in all respects.

I claim:

1. A system for supplying AC power to a display via a low voltage cable comprising:
   a transmitter energized by a first voltage, the transmitter generating a second voltage by way of a first converter circuit.
   a receiver energized by the second voltage, the receiver generating and supplying a third voltage to the display;
   a low voltage cable comprising at least two wires, the low voltage cable connecting the transmitter and the receiver;
   wherein the first voltage is AC, the second voltage is DC and the third voltage is AC;
   wherein the transmitter further comprises:.
   a limiting circuit having engaged and disengaged positions, such that the disengaged position limits power transmitted via the low voltage cable to a first wattage and the engaged position allows up to a second wattage to be transmitted via the low voltage cable;
   an interrogating circuit controlling the limiting circuit by way of interrogating the receiver with an interrogating signal at a predetermined frequency and placing the limiting circuit in the engaged position if the receiver is in communication with the transmitter and placing the limiting circuit in the disengaged position if the receiver is not in communication with the transmitter;
   wherein the receiver further comprises:
   a second converter circuit converting the second voltage to the fourth voltage;
   an inverter circuit converting the fourth voltage to the third voltage;
   wherein the fourth voltage is DC and double the second voltage;
   wherein the first voltage is between 100V and 240V; the second voltage is 60V;
   the third voltage is between 95V and 120V;
   wherein the first wattage is 100 W; the second wattage is 172W;
   wherein the limiting circuit further comprises:
   a first fuse connected serially to the first converter circuit;
   a second fuse connected serially to the first fuse;
   a relay connected in parallel with the first fuse between the first converter circuit and the second fuse, such that the relay is open in the disengaged position and closed in the engaged position.

2. A system for supplying AC power to a display via a low voltage cable as in claim 1, wherein the first fuse has lower current rating than the second fuse.

3. A system for supplying AC power to a display via a low voltage cable as in claim 2, wherein interrogating the receiver by the interrogating circuit further comprises receiving by the interrogating circuit a positive or negative authentication signal, such that the positive authentication signal is received when the receiver is capable of accepting the second wattage and the negative authentication signal is recieved when the receiver is not capable of accepting the second wattage, wherein the interrogating circuit placing the limiting circuit in the engaged position in the event the positive authentication signal is received and placing the limiting circuit in the disengaged position in the event the negative authentication signal is received.

4. A system for supplying AC power to a display via a low voltage cable as in claim 3, wherein the receiver further comprises a responding circuit communicating either the positive or negative authentication signal to the interrogating circuit in response to the interrogating signal.

5. A system for supplying AC power to a display via a low voltage cable as in claim 4, wherein the transmitter further comprises a first combiner circuit connected serially to the second fuse and in communication with the interrogating circuit combining the second voltage and the interrogating signal and separating the second voltage from the positive or negative authentication signal.

6. A system for supplying AC power to a display via a low voltage cable as in claim 5, wherein the receiver further comprises a second combiner circuit connected serially to the second converter circuit and in communication with the responding circuit, the second combiner circuit combining the second voltage with the positive or negative authentication signal and separating the second voltage from the interrogating signal.

7. A system for supplying AC power to a display via a low voltage cable as in claim 6, wherein the receiver further comprising a current managing circuit increasing voltage to the display at a predetermined rate.

8. A system for supplying AC power to a display via a low voltage cable as in claim 7, wherein the predetermined rate is between 10 and 50 volts per second.

9. A system for supplying AC power to a display via a low voltage cable as in claim 8, wherein the current nana mg circuit further disconnecting power from the display if a preprogrammed power consumed by the display is exceeded.

10. A system for supplying AC power to a display via a low voltage cable as in claim 9, wherein the preprogrammed power is 150 watts.

11. A system for supplying AC power to a display via a low voltage cable as in claim 10, wherein the current managing circuit further disconnecting power from the display if the third voltage falls below a predetermined threshold.

12. A system for supplying AC power to a display via a low voltage cable as in claim 11, wherein the predetermined threshold is 50 volts.

13. A system for supplying AC power to a display via a low voltage cable as in claim 12, wherein the low voltage cable is selected from the group consisting of a CAT5 cable, CAT6 cable and CAT7 cable.

* * * * *